United States Patent
Takatani et al.

(10) Patent No.: US 12,312,649 B2
(45) Date of Patent: May 27, 2025

(54) METHOD FOR PRODUCING GRAIN ORIENTED ELECTRICAL STEEL SHEET

(71) Applicant: NIPPON STEEL CORPORATION, Tokyo (JP)

(72) Inventors: Shinsuke Takatani, Tokyo (JP); Yoshiyuki Ushigami, Tokyo (JP); Shuichi Nakamura, Tokyo (JP); Shohji Nagano, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 823 days.

(21) Appl. No.: 17/421,938

(22) PCT Filed: Jan. 16, 2020

(86) PCT No.: PCT/JP2020/001151
§ 371 (c)(1),
(2) Date: Jul. 9, 2021

(87) PCT Pub. No.: WO2020/149326
PCT Pub. Date: Jul. 23, 2020

(65) Prior Publication Data
US 2022/0119905 A1    Apr. 21, 2022

(30) Foreign Application Priority Data
Jan. 16, 2019 (JP) .................. 2019-004874

(51) Int. Cl.
*C21D 9/46* (2006.01)
*C21D 8/12* (2006.01)
(Continued)

(52) U.S. Cl.
CPC ............. *C21D 9/46* (2013.01); *C21D 8/1222* (2013.01); *C21D 8/1233* (2013.01);
(Continued)

(58) Field of Classification Search
CPC ...... C21D 9/46; C21D 8/1222; C21D 8/1233; C21D 8/1261; C21D 8/1272
See application file for complete search history.

(56) References Cited

U.S. PATENT DOCUMENTS

| 3,932,236 A | 1/1976 | Wada et al. |
| 7,364,629 B2 * | 4/2008 | Ushigami ............ C21D 8/1272 148/113 |

(Continued)

FOREIGN PATENT DOCUMENTS

| JP | 49-96920 A | 9/1974 |
| JP | 4-124282 A | 4/1992 |

(Continued)

OTHER PUBLICATIONS

Takeda Kazutoshi et.al.[JP2000038615A] [Machine Translation] (Year: 2000).*

(Continued)

*Primary Examiner* — Brian D Walck
*Assistant Examiner* — Nazmun Nahar Shams
(74) *Attorney, Agent, or Firm* — Birch, Stewart, Kolasch & Birch, LLP

(57) ABSTRACT

A method for producing a grain oriented electrical steel sheet includes a decarburization annealing process where an oxidation degree $PH_2O/PH_2$ is controlled, an annealing separator applying process where a mass ratio of MgO and $Al_2O_3$ in an annealing separator is controlled, a final annealing process where an oxidation degree is controlled when atmosphere includes hydrogen or a dew point is controlled when atmosphere consists of inert gas, and an insulation coating forming process where a baking temperature and a heat treatment temperature are controlled.

8 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*C22C 38/42* (2006.01)
*C22C 38/44* (2006.01)
*C22C 38/48* (2006.01)
*C22C 38/50* (2006.01)
*C22C 38/60* (2006.01)
*C23C 28/04* (2006.01)
*C23G 1/02* (2006.01)

(52) U.S. Cl.
CPC ......... *C21D 8/1255* (2013.01); *C21D 8/1261* (2013.01); *C21D 8/1272* (2013.01); *C21D 8/1283* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *C22C 38/60* (2013.01); *C23C 28/04* (2013.01); *C23G 1/02* (2013.01); *C21D 2201/05* (2013.01)

(56) References Cited

U.S. PATENT DOCUMENTS

| | | |
|---|---|---|
| 2003/0188806 A1 | 10/2003 | Fujii et al. |
| 2005/0217761 A1 | 10/2005 | Ushigami et al. |
| 2018/0305784 A1 | 10/2018 | Fujimura et al. |
| 2019/0249270 A1* | 8/2019 | Yamada .................. C21D 9/60 |
| 2022/0112573 A1 | 4/2022 | Takatani et al. |

FOREIGN PATENT DOCUMENTS

| | | |
|---|---|---|
| JP | 9-316656 A | 12/1997 |
| JP | 10-1779 A | 1/1998 |
| JP | 2003-268450 A | 9/2003 |
| WO | WO 02/088403 A1 | 11/2002 |
| WO | WO 2017/073615 A1 | 5/2017 |
| WO | WO 2020/149321 A1 | 7/2020 |

OTHER PUBLICATIONS

Suehiro Ryuichi et.al.[JP2017150009A][Machine Translation] (Year: 2017).*

* cited by examiner

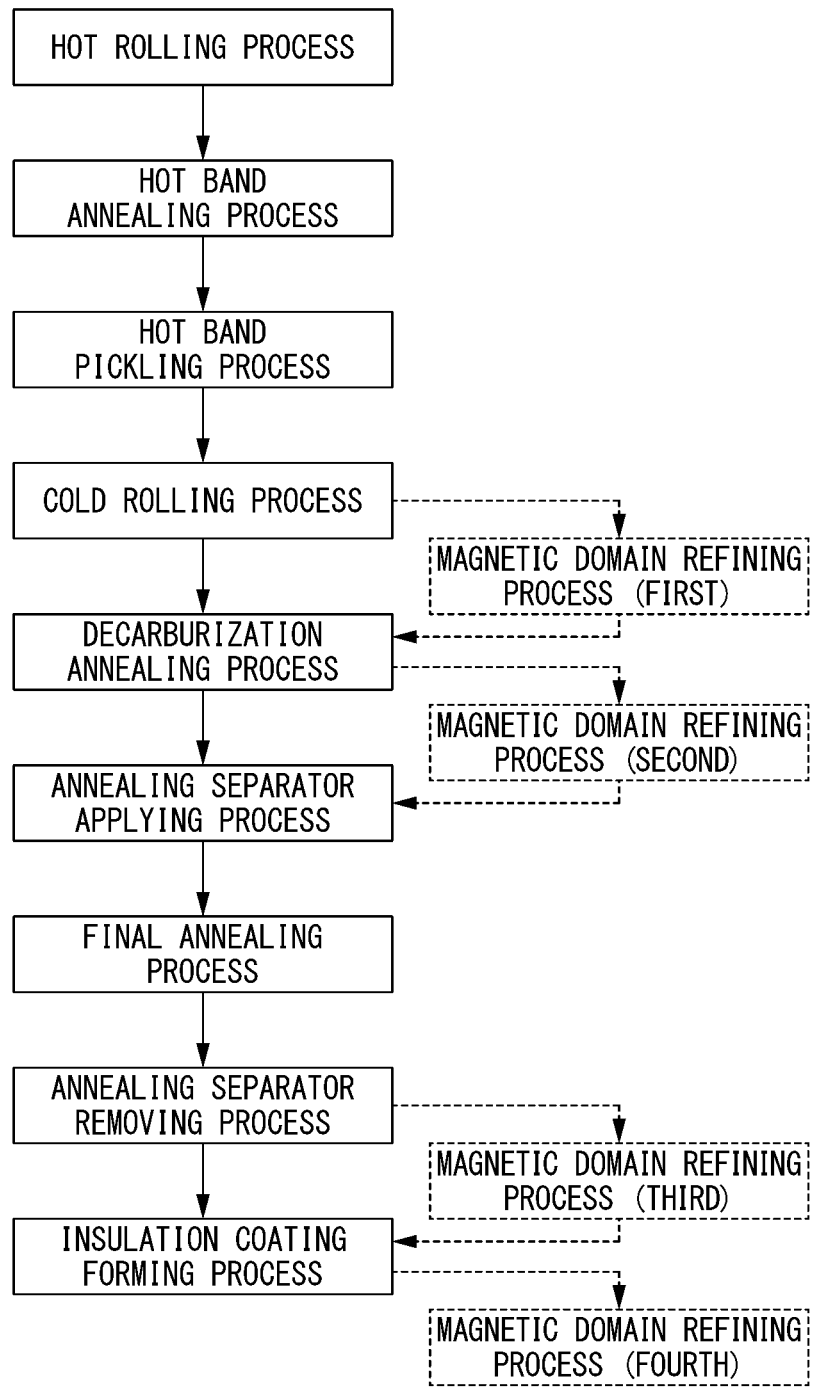

METHOD FOR PRODUCING GRAIN ORIENTED ELECTRICAL STEEL SHEET

TECHNICAL FIELD

The present invention relates to a method for producing a grain oriented electrical steel sheet.

Priority is claimed on Japanese Patent Application No. 2019-004874, filed on Jan. 16, 2019, and the content of which is incorporated herein by reference.

BACKGROUND ART

A grain oriented electrical steel sheet is used mainly in a transformer. A transformer is continuously excited over a long period of time from installation to disuse such that energy loss continuously occurs. Therefore, energy loss occurring when the transformer is magnetized by an alternating current, that is, iron loss is a main index that determines the performance of the transformer.

In order to reduce iron loss of a grain-oriented electrical steel sheet, various methods have been developed. Examples of the methods include a method of highly aligning grains in the {110}<001> orientation called Goss orientation in a crystal structure, a method of increasing the content of a solid solution element such as Si that increases electric resistance in a steel sheet, and a method of reducing the thickness of a steel sheet.

In addition, it is known that a method of applying tension to a steel sheet is effective for reducing iron loss. Thus, in general, in order to reduce the iron loss, an insulation coating is formed on a surface of the grain oriented electrical steel sheet. The coating applies the tension to the grain oriented electrical steel sheet, and thereby, reduces the iron loss as a single steel sheet. Moreover, the coating ensures interlaminar electrical insulation when the grain oriented electrical steel sheets are utilized after being laminated, and thereby, reduces the iron loss as an iron core.

For instance, as the grain oriented electrical steel sheet with the coating, a forsterite film which is an oxide film including Mg is formed on a surface of a base steel sheet, and then, the insulation coating is formed on a surface of the forsterite film. In the case, the coating on the base steel sheet includes the forsterite film and the insulation coating. The forsterite film and the insulation coating respectively have a function of increasing the electrical insulation and applying the tension to the base steel sheet.

The forsterite film which is the oxide film including Mg is formed, during final annealing which is a heat treatment at 900 to 1200° C. for 30 hours or more to make the steel sheet be secondary-recrystallized, by reacting an annealing separator mainly including magnesia (MgO) with silicon dioxide ($SiO_2$) formed on the base steel sheet during decarburization annealing.

The insulation coating is formed by applying coating solution including, for instance, phosphoric acid or phosphate, colloidal silica, and chromic anhydride or chromate to the base steel sheet after final annealing, and by baking and drying it at 300 to 950° C. for 10 seconds or more.

In order that the coating ensures the function of increasing the insulation and applying the tension to the base steel sheet, sufficient adhesion is required between the coating and the base steel sheet.

Conventionally, the above adhesion has been mainly ensured by the anchor effect derived from the unevenness of an interface between the base steel sheet and the forsterite film. However, in recent years, it has been found that the unevenness of the interface becomes an obstacle of movement of a magnetic domain wall when the grain oriented electrical steel sheet is magnetized, and thus, the unevenness is also a factor that hinders the reduction of iron loss.

For instance, Japanese Unexamined Patent Application, First Publication No. S49-096920 (Patent Document 1) and PCT International Publication No. WO2002/088403 (Patent Document 2) disclose a technique to ensure the adhesion of the insulation coating even in a state in which the forsterite film which is the oxide film including Mg does not exist and the interface is smooth in order to further reduce the iron loss.

In the method for producing the grain oriented electrical steel sheet as disclosed in the Patent Document 1, the forsterite film is removed by pickling or the like and then the surface of the base steel sheet is smoothened by chemical polishing or electrolytic polishing. In the method for producing the grain oriented electrical steel sheet as disclosed in the Patent Document 2, the formation of the forsterite film itself is suppressed by using an annealing separator containing alumina ($Al_2O_3$) for the final annealing and thereby the surface of the base steel sheet is smoothened.

However, in the producing methods as disclosed in the Patent Document 1 and the Patent Document 2, there is a problem that the insulation coating is difficult to adhere to the surface of the base steel sheet (sufficient adhesion is not obtained) in a case where the insulation coating is formed in contact with the surface of the base steel sheet (directly on the surface of the base steel sheet).

RELATED ART DOCUMENTS

Patent Documents

[Patent Document 1] Japanese Unexamined Patent Application, First Publication No. S49-096920

[Patent Document 2] PCT International Publication No. WO2002/088403

SUMMARY OF INVENTION

Technical Problem to be Solved

The present invention has been made in consideration of the above mentioned situations. An object of the invention is to provide a method for producing a grain oriented electrical steel sheet without the forsterite film and excellent in magnetic characteristics (in particular, iron loss) and the coating adhesion.

Solution to Problem

The present inventors have investigated a technique to improve the adhesion (coating adhesion) between the steel sheet and the insulation coating even in a case where the forsterite film is not formed for reducing the iron loss and the insulation coating is formed on the surface of the grain oriented electrical steel sheet in which the surface of the steel sheet is smoothened.

As a result, it has been found that it is possible to produce the grain oriented electrical steel sheet without the forsterite film and excellent in the magnetic characteristics and the coating adhesion by appropriately combining predetermined processes.

An aspect of the present invention employs the following.

(1) A method for producing a grain oriented electrical steel sheet according to an aspect of the present invention includes:

a hot rolling process of hot-rolling a steel piece to obtain a hot rolled steel sheet, the steel piece including, as a chemical composition, by mass %, 0.030 to 0.100% of C,
0.80 to 7.00% of Si,
0.01 to 1.00% of Mn,
0 to 0.060% in total of S and Se,
0.010 to 0.065% of acid soluble Al,
0.004 to 0.012% of N,
0 to 0.30% of Cr,
0 to 0.40% of Cu,
0 to 0.50% of P,
0 to 0.30% of Sn,
0 to 0.30% of Sb,
0 to 1.00% of Ni,
0 to 0.008% of B,
0 to 0.15% of V,
0 to 0.20% of Nb,
0 to 0.10% of Mo,
0 to 0.015% of Ti,
0 to 0.010% of Bi, and
a balance consisting of Fe and impurities;

a hot band annealing process subsequent to the hot rolling process, the hot band annealing process of annealing the hot rolled steel sheet to obtain a hot band annealed sheet;

a hot band pickling process subsequent to the hot band annealing process, the hot band pickling process of pickling the hot band annealed sheet;

a cold rolling process subsequent to the hot band pickling process, the cold rolling process of cold-rolling the hot band annealed sheet to obtain a cold rolled steel sheet;

a first magnetic domain refining process subsequent to the cold rolling process, the first magnetic domain refining process of optionally conducting a magnetic domain refining treatment for the cold rolled steel sheet;

a decarburization annealing process subsequent to the cold rolling process or the first magnetic domain refining process, the decarburization annealing process of decarburization-annealing the cold rolled steel sheet to obtain a decarburization annealed sheet;

a second magnetic domain refining process subsequent to the decarburization annealing process, the second magnetic domain refining process of optionally conducting a magnetic domain refining treatment for the decarburization annealed sheet;

an annealing separator applying process subsequent to the decarburization annealing process or the second magnetic domain refining process, the annealing separator applying process of applying and drying an annealing separator including $Al_2O_3$ and MgO to the decarburization annealed sheet;

a final annealing process subsequent to the annealing separator applying process, the final annealing process of final-annealing the decarburization annealed sheet after applying the annealing separator to obtain a final annealed sheet;

an annealing separator removing process subsequent to the final annealing process, the annealing separator removing process of removing a redundant annealing separator from a surface of the final annealed sheet;

a third magnetic domain refining process subsequent to the annealing separator removing process, the third magnetic domain refining process of optionally conducting a magnetic domain refining treatment for the final annealed sheet; and an insulation coating forming process subsequent to the annealing separator removing process or the third magnetic domain refining process, the insulation coating forming process of forming an insulation coating on the surface of the final annealed sheet, wherein, in the decarburization annealing process,
$PH_2O/PH_2$ which is an oxidation degree of an atmosphere is 0.01 to 0.15, an annealing temperature is 750 to 900° C., and a holding is 10 to 600 seconds, wherein, in the annealing separator applying process,
$MgO/(MgO+Al_2O_3)$ which is a mass ratio of MgO and $Al_2O_3$ is 5 to 50%, and a hydration water is 1.5 mass % or less in the annealing separator, wherein, in the final annealing process,
an oxidation degree is 0.00010 to 0.2 when an atmosphere includes a hydrogen, or a dew point is 0° C. or less when an atmosphere consists of an inert gas without a hydrogen, and wherein, in the insulation coating forming process,
the insulation coating is formed by applying an insulation coating forming solution which mainly includes a phosphate or a colloidal silica, by baking at 350 to 600° C., and then by heat-treating at 800 to 1000° C.

(2) In the method for producing the grain oriented electrical steel sheet according to (1), in the decarburization annealing process, a nitriding treatment may be conducted by annealing the cold rolled steel sheet in an atmosphere including ammonia.

(3) In the method for producing the grain oriented electrical steel sheet according to (1) or (2), any one process of the first magnetic domain refining process, the second magnetic domain refining process, and the third magnetic domain refining process may be only conducted.

(4) The method for producing the grain oriented electrical steel sheet according to any one of (1) to (3) may include, a fourth magnetic domain refining process subsequent to the insulation coating forming process.

(5) In the method for producing the grain oriented electrical steel sheet according to any one of (1) to (4), any one process of the first magnetic domain refining process, the second magnetic domain refining process, the third magnetic domain refining process, and the fourth magnetic domain refining process may be only conducted.

(6) In the method for producing the grain oriented electrical steel sheet according to any one of (1) to (5), in the annealing separator removing process, a pickling may be conducted after water-washing using an acidic solution whose volume concentration is less than 20%.

(7) In the method for producing the grain oriented electrical steel sheet according to any one of (1) to (6), the steel piece may include, as the chemical composition, by mass %, at least one selected from a group consisting of 0.02 to 0.30% of Cr,
0.05 to 0.40% of Cu,
0.005 to 0.50% of P,
0.02 to 0.30% of Sn,
0.01 to 0.30% of Sb,
0.01 to 1.00% of Ni,
0.0005 to 0.008% of B,
0.002 to 0.15% of V,
0.005 to 0.20% of Nb, 0.005 to 0.10% of Mo,
0.002 to 0.015% of Ti, and
0.001 to 0.010% of Bi.

Effects of Invention

According to the above aspects of the present invention, it is possible to provide the method for producing the grain oriented electrical steel sheet without the forsterite film and excellent in the magnetic characteristics and the coating adhesion.

BRIEF DESCRIPTION OF DRAWINGS

FIG. 1 is a flow chart illustrating a method for producing a grain oriented electrical steel sheet according to an embodiment of the present invention.

DETAILED DESCRIPTION OF PREFERRED EMBODIMENTS

Hereinafter, a preferable embodiment of the present invention is described in detail. However, the present invention is not limited only to the configuration which is disclosed in the embodiment, and various modifications are possible without departing from the aspect of the present invention. In addition, the limitation range as described in the embodiment includes a lower limit and an upper limit thereof. However, the value expressed by "more than" or "less than" does not include in the limitation range. "%" of the amount of respective elements expresses "mass %".

A method for producing a grain oriented electrical steel sheet according to an embodiment of the present invention (hereinafter, referred to as "the method for producing the grain oriented electrical steel sheet according to the embodiment") is the method for producing the grain oriented electrical steel sheet without a forsterite film and includes the following processes.

(i) Hot rolling process of hot-rolling a steel piece including predetermined chemical composition to obtain a hot rolled steel sheet.

(ii) Hot band annealing process subsequent to the hot rolling process, the hot band annealing process of annealing the hot rolled steel sheet to obtain a hot band annealed sheet.

(iii) Hot band pickling process subsequent to the hot band annealing process, the hot band pickling process of pickling the hot band annealed sheet.

(iv) Cold rolling process subsequent to the hot band pickling process, the cold rolling process of cold-rolling the hot rolled steel sheet by cold-rolling once or by cold-rolling plural times with an intermediate annealing to obtain a cold rolled steel sheet.

(v) First magnetic domain refining process subsequent to the cold rolling process, the first magnetic domain refining process of optionally conducting a magnetic domain refining treatment for the cold rolled steel sheet.

(vi) Decarburization annealing process subsequent to the cold rolling process or the first magnetic domain refining process, the decarburization annealing process of decarburization-annealing the cold rolled steel sheet to obtain a decarburization annealed sheet.

(vii) Second magnetic domain refining process subsequent to the decarburization annealing process, the second magnetic domain refining process of optionally conducting a magnetic domain refining treatment for the decarburization annealed sheet.

(viii) Annealing separator applying process subsequent to the decarburization annealing process or the second magnetic domain refining process, the annealing separator applying process of applying and drying an annealing separator including $Al_2O_3$ and MgO to the decarburization annealed sheet.

(ix) Final annealing process subsequent to the annealing separator applying process, the final annealing process of final-annealing the decarburization annealed sheet after applying the annealing separator to obtain a final annealed sheet.

(x) Annealing separator removing process subsequent to the final annealing process, the annealing separator removing process of removing a redundant annealing separator from a surface of the final annealed sheet by methods including one or both of water-washing and pickling.

(xi) Third magnetic domain refining process subsequent to the annealing separator removing process, the third magnetic domain refining process of optionally conducting a magnetic domain refining treatment for the final annealed sheet.

(xii) Insulation coating forming process subsequent to the annealing separator removing process or the third magnetic domain refining process, the insulation coating forming process of forming an insulation coating on the surface of the final annealed sheet.

In the method for producing the grain oriented electrical steel sheet according to the embodiment, each of the above processes is controlled as explained below, and the above processes are conducted in the above order without including other process therein. It is necessary to control not only one process in the above processes but each of the above processes comprehensively and inseparably. Only when each of the above processes is controlled under predetermined conditions and is appropriately combined, it is possible to reduce the iron loss and improve the coating adhesion.

However, other process may be included before the hot rolling process or after the insulation coating forming process. For instance, the method for producing the grain oriented electrical steel sheet according to the embodiment may further include the following process after the insulation coating forming process.

(xiii) Fourth magnetic domain refining process subsequent to the insulation coating forming process, the fourth magnetic domain refining process of conducting a magnetic domain refining treatment for the grain oriented electrical steel sheet.

In addition, other process may be included as long as the process does not adversely affect the magnetic characteristics and the coating adhesion between the process (i) and the process (xii). For instance, in order to remove surface scale, a pickling process may be included between the hot rolling process and the hot band annealing process.

Hereinafter, each process is described in detail.

<Hot Rolling Process>

In the hot rolling process, the steel piece is hot-rolled to obtain the hot rolled steel sheet, the steel piece including, as the chemical composition, by mass %, 0.030 to 0.100% of C,
0.80 to 7.00% of Si,
0.01 to 1.00% of Mn,
0 to 0.060% in total of S and Se,
0.010 to 0.065% of acid soluble Al,
0.004 to 0.012% of N,
0 to 0.30% of Cr,
0 to 0.40% of Cu, 0 to 0.50% of P,
0 to 0.30% of Sn,
0 to 0.30% of Sb,
0 to 1.00% of Ni,
0 to 0.008% of B,
0 to 0.15% of V,
0 to 0.20% of Nb,
0 to 0.10% of Mo,
0 to 0.015% of Ti,
0 to 0.010% of Bi, and
a balance consisting of Fe and impurities. In the embodiment, the steel sheet after the hot rolling process is referred to as the hot rolled steel sheet.

The method for making the steel piece (slab) to be used in the hot rolling process is not limited. For instance, molten steel with predetermined chemical composition may be made, and the slab may be made by using the molten steel. The slab may be made by continuous casting. An ingot may be made by using the molten steel, and then, the slab may be made by blooming the ingot. Moreover, the slab may be made by other methods.

A thickness of the slab is not particularly limited. The thickness of the slab may be 150 to 350 mm for instance. The thickness of the slab is preferably 220 to 280 mm. The slab with the thickness of 10 to 70 mm which is a so-called thin slab may be used.

Limitation reasons of the chemical composition of the steel piece are explained. Hereinafter, "%" of the chemical composition represents "mass %".

(0.030 to 0.100% of C)

C (carbon) is an element effective in controlling the primary recrystallized structure, but negatively affective in the magnetic characteristics. Thus, C is the element to be removed by decarburization annealing before final annealing. When the C content is more than 0.100%, a time for decarburization annealing needs to be prolonged, and the productivity decreases. Thus, the C content is to be 0.100% or less. The C content is preferably 0.085% or less, and more preferably 0.070% or less.

It is favorable that the C content is lower. However, when considering the productivity in industrial production and the magnetic characteristics of the product, the lower limit of the C content is substantially 0.030%.

(0.80 to 7.00% of Si)

Si (silicon) increases the electric resistance of grain oriented electrical steel sheet, and thereby, reduces the iron loss. When the Si content is less than 0.80%, γ transformation occurs during the final annealing and the crystal orientation of grain oriented electrical steel sheet is impaired. Thus, the Si content is to be 0.80% or more. The Si content is preferably 2.00% or more, and more preferably 2.50% or more.

On the other hand, when the Si content is more than 7.00%, the cold workability deteriorates and the cracks tend to occur during cold rolling. Thus, the Si content is to be 7.00% or less. The Si content is preferably 4.50% or less, and more preferably 4.00% or less.

(0.01 to 1.00% of Mn)

Mn (manganese) increases the electric resistance of grain oriented electrical steel sheet, and thereby, reduces the iron loss. Moreover, Mn forms MnS and/or MnSe which act as the inhibitor by bonding to S and/or Se. When the Mn content is within 0.01 to 1.00%, the secondary recrystallization becomes stable. Thus, the Mn content is to be 0.01 to 1.00%. The lower limit of the Mn content is preferably 0.08%, and more preferably 0.09%. The upper limit of the Mn content is preferably 0.50%, and more preferably 0.20%.

(0 to 0.060% in Total of One or Both of S and Se)

S (sulfur) and Se (selenium) are elements to form MnS and/or MnSe which act as the inhibitor by bonding to Mn.

When the total amount of one or both of S and Se (S+Se) is more than 0.060%, the dispersion state of precipitation of MnS and/or MnSe becomes uneven. In the case, the desired secondary recrystallized structure cannot be obtained, and the magnetic flux density may decrease. Moreover, MnS remains in the steel after purification annealing, and the hysteresis loss may increase. Thus, the total amount of S and Se is to be 0.060% or less.

The lower limit of the total amount of S and Se is not particularly limited, and may be 0%. The lower limit thereof may be 0.003%. When the inhibitor thereof is used, the lower limit is preferably 0.015%.

(0.010 to 0.065% of Acid Soluble Al (Sol. Al))

The acid soluble Al (aluminum) is an element to form (Al, Si)N which acts as the inhibitor by bonding to N. When the amount of acid soluble Al is less than 0.010%, the effect of addition is not sufficiently obtained, and the secondary recrystallization does not proceed sufficiently. Thus, the amount of acid soluble Al is to be 0.010% or more. The amount of acid soluble Al is preferably 0.015% or more, and more preferably 0.020% or more.

On the other hand, when the amount of acid soluble Al is more than 0.065%, the dispersion state of precipitation of AlN and/or (Al, Si)N becomes uneven, the desired secondary recrystallized structure cannot be obtained, and the magnetic flux density decreases. Thus, the amount of acid soluble Al (Sol. Al) is to be 0.065% or less. The amount of acid soluble Al is preferably 0.055% or less, and more preferably 0.050% or less.

(0.004 to 0.012% of N)

N (nitrogen) is an element to form AlN and/or (Al, Si)N which act as the inhibitor by bonding to Al. When the N content is less than 0.004%, the formation of AlN and/or (Al, Si)N becomes insufficient. Thus, the N content is to be 0.004% or more. The N content is preferably 0.006% or more, and more preferably 0.007% or more.

On the other hand, when the N content is more than 0.012%, the blisters (voids) may be formed in the steel sheet. Thus, the N content is to be 0.012% or less.

The steel piece includes, as the chemical composition, the above elements, and the balance consists of Fe and impurities. However, in consideration of the influence on the magnetic characteristics and the improvement of the inhibitors functions by forming compounds, the steel piece may include at least one of optional elements as substitution for a part of Fe. For instance, the optional elements included as substitution for a part of Fe may be Cr, Cu, P, Sn, Sb, Ni, B, V, Nb, Mo, Ti, and Bi. However, the optional elements do not need to be included, the lower limits thereof may be 0% respectively. Moreover, even if the optional elements may be included as impurities, the above mentioned effects are not affected. Herein, the impurities correspond to elements which are contaminated during industrial production of steel from ores and scrap that are used as a raw material of steel, or from environment of a production process.

(0 to 0.30% of Cr)

Cr (chrome) is an element effective in increasing the electric resistance, and thereby, reducing the iron loss, in common with Si. Thus, Cr may be included. In order to obtain the above effects, the Cr content is preferably 0.02% or more, and more preferably 0.05% or more.

On the other hand, when the Cr content is more than 0.30%, the magnetic flux density may deteriorate. Thus, the upper limit of the Cr content is preferably 0.30%, more preferably 0.20%, and further more preferably 0.12%.

(0 to 0.40% of Cu)

Cu (copper) is also an element effective in increasing the electric resistance, and thereby, reducing the iron loss. Thus, Cu may be included. In order to obtain the above effects, the Cu content is preferably 0.05% or more, and more preferably 0.10% or more.

On the other hand, when the Cu content is more than 0.40%, the improvement effect of reducing the iron loss may be saturated, and surface defects called "copper scab" may be incurred during hot rolling. Thus, the upper limit of the Cu content is preferably 0.40%, more preferably 0.30%, and further more preferably 0.20%.

(0 to 0.50% of P)

P (phosphorus) is also an element effective in increasing the electric resistance, and thereby, reducing the iron loss. Thus, P may be included. In order to obtain the above effects, the P content is preferably 0.005% or more, and more preferably 0.010% or more.

On the other hand, when the P content is more than 0.50%, the rollability may deteriorate. Thus, the upper limit of the P content is preferably 0.50%, more preferably 0.20%, and further more preferably 0.15%.

(0 to 0.30% of Sn)
(0 to 0.30% of Sb)

Sn (tin) and Sb (antimony) are elements effective in stabilizing the secondary recrystallization, and thereby, developing the 11101<001> orientation. Thus, Sn and Sb may be included. In order to obtain the above effects, the Sn content is preferably 0.02% or more, and more preferably 0.05% or more. Moreover, the Sb content is preferably 0.01% or more, and more preferably 0.03% or more.

On the other hand, when the Sn content is more than 0.30% or when the Sb content is more than 0.30%, the magnetic characteristics may deteriorate. Thus, the upper limits of the Sn content and the Sb content are preferably 0.30% respectively. The upper limit of the Sn content is preferably 0.15%, and more preferably 0.10%. Moreover, the upper limit of the Sb content is preferably 0.15%, and more preferably 0.10%.

(0 to 1.00% of Ni)

Ni (nickel) is also an element effective in increasing the electric resistance, and thereby, reducing the iron loss. Moreover, Ni is an element effective in controlling the metallographic structure of the hot rolled steel sheet, and thereby, improving the magnetic characteristics. Thus, Ni may be included. In order to obtain the above effects, the Ni content is preferably 0.01% or more, and more preferably 0.02% or more.

On the other hand, when the Ni content is more than 1.00%, the secondary recrystallization may be unstable. Thus, the Ni content is preferably 1.00% or less, more preferably 0.20% or less, and further more preferably 0.10% or less.

(0 to 0.008% of B)

B (boron) is an element effective in forming BN which acts as the inhibitor by bonding to N. Thus, B may be included. In order to obtain the above effects, the B content is preferably 0.0005% or more, and more preferably 0.0010% or more.

On the other hand, when the B content is more than 0.008%, the magnetic characteristics may deteriorate. Thus, the upper limit of the B content is preferably 0.008%, more preferably 0.005%, and further more preferably 0.003%.

(0 to 0.15% of V)
(0 to 0.20% of Nb)
(0 to 0.015% of Ti)

V (vanadium), Nb (niobium), and Ti (titanium) are elements which act as the inhibitor by bonding to N, C, and the like. Thus, V, Nb, and Ti may be included. In order to obtain the above effects, the V content is preferably 0.002% or more, and more preferably 0.010% or more. The Nb content is preferably 0.005% or more, and more preferably 0.020% or more. The Ti content is preferably 0.002% or more, and more preferably 0.004% or more.

On the other hand, when the V content is more than 0.15%, when the Nb content is more than 0.20%, or when the Ti content is more than 0.015% in the steel piece, there elements may remain in the final product. In the case, as the final product, the V content may be more than 0.15%, the Nb content may be more than 0.20%, or the Ti content may be more than 0.015%. As a result, the magnetic characteristics of the final product (grain oriented electrical steel sheet) may deteriorate.

Thus, the upper limit of the V content is preferably 0.15%, more preferably 0.10%, and further more preferably 0.05%. The upper limit of the Ti content is preferably 0.015%, more preferably 0.010%, and further more preferably 0.008%. Thus, the upper limit of the Nb content is preferably 0.20%, more preferably 0.10%, and further more preferably 0.08%.

(0 to 0.10% of Mo)

Mo (molybdenum) is also an element effective in increasing the electric resistance, and thereby, reducing the iron loss. Thus, Mo may be included. In order to obtain the above effects, the Mo content is preferably 0.005% or more, and more preferably 0.01% or more.

On the other hand, when the Mo content is more than 0.10%, the rollability of the steel sheet may deteriorate. Thus, the upper limit of the Mo content is preferably 0.10%, more preferably 0.08%, and further more preferably 0.05%.

(0 to 0.010% of Bi)

Bi (bismuth) is an element effective in stabilizing precipitates such as sulfide, and thereby, improving the inhibitors functions. Thus, Bi may be included. In order to obtain the above effects, the Bi content is preferably 0.001% or more, and more preferably 0.002% or more.

On the other hand, when the Bi content is more than 0.010%, the magnetic characteristics may deteriorate. Thus, the upper limit of the Bi content is preferably 0.010%, more preferably 0.008%, and further more preferably 0.006%.

The chemical composition as described above may be measured by typical analytical methods for the steel. For instance, the chemical composition may be measured by using ICP-AES (Inductively Coupled Plasma-Atomic Emission Spectrometer: inductively coupled plasma emission spectroscopy spectrometry). Herein, the acid soluble Al may be measured by ICP-AES using filtrate after heating and dissolving the sample in acid. In addition, C and S may be measured by the infrared absorption method after combustion, N may be measured by the thermal conductometric method after fusion in a current of inert gas, and O may be measured by, for instance, the non-dispersive infrared absorption method after fusion in a current of inert gas.

Next, conditions for hot-rolling the above steel piece are explained.

The conditions of the hot rolling are not particularly limited. For instance, the conditions are as follows.

The slab is heated before the hot rolling. The slab is put and heated in a known heating furnace or a known soaking furnace. As one method, the slab is heated to 1280° C. or less. By setting the heating temperature of the slab to 1280° C. or less, for instance, it is possible to avoid various problems when the heating temperature is more than 1280° C. (a dedicated high temperature heating furnace is required, the melt scale amount rapidly increases, and the like). The lower limit of the heating temperature of the slab is not particularly limited. However, when the heating temperature is excessively low, the hot rolling may become difficult and the productivity may be decreased. Thus, the heating temperature may be in the range of 1280° C. or less in consideration of the productivity. The lower limit of the heating temperature of the slab is preferably 1100° C. The upper limit of the heating temperature of the slab is preferably 1250° C.

In addition, as another method, the slab is heated to higher temperature of 1320° C. or more. By heating the slab to higher temperature of 1320° C. or more, it is possible to stabilize the secondary recrystallization by solutionizing AlN and Mn(S, Se) and by finely precipitating them in the subsequent processes.

The slab heating in itself may be omitted, and the hot rolling may be conducted after casting and before decreasing the temperature of the slab.

The heated slab is hot-rolled by a hot rolling mill, and thereby, the hot rolled steel sheet is obtained. The hot rolling mill includes, for instance, a rough rolling mill and a final rolling mill which is arranged downstream of the rough rolling mill. The rough rolling mill includes rough rolling stands which are in a row. Each of the rough rolling stands has plural rolls arranged one above the other. In the same way, the final rolling mill includes final rolling stands which are in a row. Each of the final rolling stands has plural rolls arranged one above the other. The heated steel piece is rolled by the rough rolling mill and then by the final rolling mill, and thereby, the hot rolled steel sheet is obtained.

A final temperature in the hot rolling process (the temperature of the steel sheet at outlet side of the final rolling stand by which the steel sheet is finally rolled in the final rolling mill) may be 700 to 1150° C. The hot rolled steel sheet is produced by the hot rolling process explained above.

<Hot Band Annealing Process>

In the hot band annealing process, the hot rolled steel sheet obtained by the hot rolling process is annealed (hot band annealed) to obtain the hot band annealed sheet. In the embodiment, the steel sheet after the hot band annealing process is referred to as the hot band annealed sheet.

The hot band annealing is conducted in order to homogenize the nonuniform structure after hot rolling, to control the precipitation of AlN which is the inhibitor (precipitate finely), and to control secondary phase, solid-soluted carbon, and the like. As the annealing conditions, known conditions may be applied according to the purpose. For instance, in order to homogenize the nonuniform structure after hot rolling, the hot rolled steel sheet is hold at 750 to 1200° C. of the heating temperature (furnace temperature in a hot band annealing furnace) for 30 to 600 seconds.

The conditions in the hot band annealing process may be determined as a result of considering the characteristics and the producing cost required for the grain oriented electrical steel sheet finally produced.

<Hot Band Pickling Process>

In the hot band pickling process, the hot rolled steel sheet after the hot rolling process or the hot band annealed sheet after the hot band annealing process in a case where the hot band annealing has been conducted is pickled in order to remove surface scale. The pickling conditions are not particularly limited, and known conditions may be appropriately applied.

<Cold Rolling Process>

In the cold rolling process, the hot band annealed sheet after the hot band pickling process is cold-rolled by once or by plural times with an intermediate annealing to obtain the cold rolled steel sheet. In the embodiment, the steel sheet after the cold rolling process is referred to as the cold rolled steel sheet.

A cold rolling reduction rate in final cold rolling (cumulative cold rolling reduction rate without intermediate annealing or cumulative cold rolling reduction rate after intermediate annealing) is preferably 80% or more, and more preferably 90% or more. The upper limit of the final cold rolling reduction rate is preferably 95%.

Herein, the final cold rolling reduction rate (%) is defined as follows.

Final cold rolling reduction rate (%)=(1−Sheet thickness of steel sheet after final cold rolling/Sheet thickness of steel sheet before final cold rolling)×100

<First Magnetic Domain Refining Process>

In the first magnetic domain refining process, as necessary, the magnetic domain refining treatment is conducted for the cold rolled steel sheet. For instance, as the magnetic domain refining treatment, the groove is formed lineally or punctiformly so as to extend in the direction intersecting the rolling direction and so as to have the predetermined interval in the rolling direction. By forming the above groove, the width of 180° domain is narrowed (180° domain may be refined). By conducting the magnetic domain refining treatment, it is possible to improve the magnetic characteristics of the final product (grain oriented electrical steel sheet). As a method for forming the groove, it is possible to apply a mechanical groove forming method such as toothed gear, a chemical groove forming method such as electrolytic etching, a thermal groove forming method such as laser irradiation, and the like.

As explained below, the magnetic domain refining treatment may be conducted after the decarburization annealing process (as the second magnetic domain refining process), after the final annealing process (as the third magnetic domain refining process), or after the insulation coating forming process (as the fourth magnetic domain refining process). Even when the magnetic domain refining treatment is conducted plural times, the effect thereof is saturated, and the producing cost increases. Thus, it is preferable to only conduct any one process selected from the first magnetic domain refining process to the fourth magnetic domain refining process.

<Decarburization Annealing Process>

In the decarburization annealing process, the cold rolled steel sheet after the cold rolling process is subjected to the magnetic domain refining treatment (first magnetic domain refining process) as necessary, and then, is decarburization-annealed to promote the primary recrystallization. Moreover, in the decarburization annealing, C which negatively affective in the magnetic characteristics is removed from the steel sheet. In the embodiment, the steel sheet after the decarburization annealing process is referred to as the decarburization annealed sheet.

For the above purposes, in the decarburization annealing, the oxidation degree ($PH_2O/PH_2$) of annealing atmosphere (furnace atmosphere) is to be 0.01 to 0.15, an annealing temperature is to be 750 to 900° C., and a holding is to be 10 to 600 seconds. The oxidation degree $PH_2O/PH_2$ is defined as the ratio of water vapor partial pressure $PH_2O$ (atm) to hydrogen partial pressure $PH_2$ (atm) in the atmosphere.

When the oxidation degree ($PH_2O/PH_2$) is less than 0.01, the decarburization speed slows down, and thereby, the productivity decreases. In addition, the decarburization does not occur properly, and thereby, the magnetic characteristics after the final annealing deteriorate. On the other hand, when the oxidation degree is more than 0.15, Fe-based oxides are formed, and thereby, it is difficult to smoothen an interface after the final annealing.

When the annealing temperature is less than 750° C., the decarburization speed slows down, and thereby, the productivity decreases. In addition, the decarburization does not occur properly, and thereby, the magnetic characteristics after the final annealing deteriorate. On the other hand, when the annealing temperature is more than 900° C., the grain size after the primary recrystallization exceeds favorable size, and thereby, the magnetic characteristics after the final annealing deteriorate.

When the holding time is less than 10 seconds, the decarburization does not occur sufficiently. On the other hand, when the holding time is more than 600 seconds, the productivity decreases. In addition, the grain size after the primary recrystallization exceeds favorable size, and thereby, the magnetic characteristics after the final annealing deteriorate.

Depending on the above oxidation degree ($PH_2O/PH_2$), a heating rate in a heating stage to the annealing temperature may be controlled. For instance, in a case where the heating including an induction heating is conducted, an average heating rate may be 5 to 1000° C./second. Moreover, in a case where the heating including an electric heating is conducted, an average heating rate may be 5 to 3000° C./second.

In addition, in the decarburization annealing process, the nitriding treatment may be conducted. In the nitriding treatment, the cold rolled steel sheet may be annealed in the atmosphere including ammonia in at least one stage before, during, or after the above holding. In a case where the temperature for heating the slab is lower, it is preferable that the nitriding treatment is conducted in the decarburization annealing process. By additionally conducting the nitriding treatment in the decarburization annealing process, the inhibitor such as AlN and (Al, Si)N is formed prior to the secondary recrystallization in the final annealing process, and thus, it is possible to make the secondary recrystallization occur stably.

Although the conditions for the nitriding treatment are not particularly limited, it is preferable to conduct the nitriding treatment so that the nitrogen content increases by 0.003% or more, preferably 0.005% or more, and more preferably 0.007% or more. When the nitrogen (N) content is more than 0.030%, the effects are saturated. Thus, the nitriding treatment may be conducted so that the nitrogen content becomes 0.030% or less.

The conditions for the nitriding treatment are not particularly limited, and known conditions may be appropriately applied.

For instance, in a case where the nitriding treatment is conducted after the holding at 750 to 900° C. for 10 to 600 seconds in the oxidation degree ($PH_2O/PH_2$) of 0.01 to 0.15, the nitriding treatment may be conducted such that the cold rolled steel sheet is not cooled to the room temperature but held in the cooling stage in the atmosphere including the ammonia. It is preferable that the oxidation degree ($PH_2O/PH_2$) in the cooling stage is within the range of 0.0001 to 0.01. Moreover, in a case where the nitriding treatment is conducted during the holding at 750 to 900° C. for 10 to 600 seconds in the oxidation degree ($PH_2O/PH_2$) of 0.01 to 0.15, the ammonia may be included in the atmospheric gas with the above oxidation degree.

<Second Magnetic Domain Refining Process>

In the second magnetic domain refining process, as necessary, the magnetic domain refining treatment is conducted for the decarburization annealed sheet. For instance, as the magnetic domain refining treatment, the groove is formed lineally or punctiformly so as to extend in the direction intersecting the rolling direction and so as to have the predetermined interval in the rolling direction. By forming the above groove, the width of 180° domain is narrowed (180° domain may be refined). By conducting the magnetic domain refining treatment, it is possible to improve the magnetic characteristics of the final product (grain oriented electrical steel sheet). As a method for forming the groove, it is possible to apply a mechanical groove forming method such as toothed gear, a chemical groove forming method such as electrolytic etching, a thermal groove forming method such as laser irradiation, and the like.

<Annealing Separator Applying Process>

In the annealing separator applying process, the annealing separator including $Al_2O_3$ and MgO is applied to the decarburization annealed sheet after the decarburization annealing process (including the decarburization annealed sheet after the nitriding treatment) or the decarburization annealed sheet after the magnetic domain refining treatment subsequent to the decarburization annealing. Thereafter, the applied annealing separator is dried.

In a case where the annealing separator includes MgO but does not include $Al_2O_3$, the forsterite film is formed on the steel sheet in the final annealing process. On the other hand, in a case where the annealing separator includes $Al_2O_3$ but does not include MgO, mullite ($3Al_2O_3 \cdot 2SiO_2$) is formed on the steel sheet. The mullite becomes the obstacle of movement of the magnetic domain wall, and thus, causes the deterioration of the magnetic characteristics of the grain oriented electrical steel sheet.

Thus, in the method for producing the grain oriented electrical steel sheet according to the embodiment, as the annealing separator, the annealing separator including $Al_2O_3$ and MgO is utilized. By utilizing the annealing separator including $Al_2O_3$ and MgO, the forsterite film is not formed on the surface of the steel sheet, and it is possible to smoothen the surface of the steel sheet after the final annealing.

For the annealing separator, $MgO/(MgO+Al_2O_3)$ which is the mass ratio of MgO and $Al_2O_3$ is to be 5 to 50%, and the hydration water is to be 1.5 mass % or less.

When $MgO/(MgO+Al_2O_3)$ is less than 5%, the mullite is excessively formed, and thus, the iron loss deteriorates. On the other hand, when $MgO/(MgO+Al_2O_3)$ is more than 50%, the forsterite is formed, and thus, the iron loss deteriorates.

When the hydration water in the annealing separator is more than 1.5 mass %, the secondary recrystallization may be unstable, and it may be difficult to smoothen the surface of the steel sheet because the surface of the steel sheet is oxidized ($SiO_2$ is formed) in the final annealing. The lower limit of the hydration water is not particularly limited, but may be 0.1 mass % for instance.

The annealing separator is applied by water slurry or by electrostatic spray. In the annealing separator applying process, the annealing separator may further include nitrides such as manganese nitride, iron nitride, and chromium nitride which are decomposed before the secondary recrystallization in the final annealing process and which nitride the decarburization annealed sheet or the decarburized and nitrided sheet.

<Final Annealing Process>

The decarburization annealed sheet after applying the above annealing separator is final-annealed to obtain the final annealed sheet. By conducting the final annealing for the decarburization annealed sheet after applying the above annealing separator, the secondary recrystallization proceeds, and the crystal orientation aligns in the 11101<001> orientation. In the embodiment, the steel sheet after the final annealing process is referred to as the final annealed sheet.

In the final annealing, in a case where the atmosphere (furnace atmosphere) includes hydrogen, the oxidation degree ($PH_2O/PH_2$) is to be 0.00010 to 0.2. In a case where the atmosphere consists of the inert gas (nitrogen, argon, and the like) without the hydrogen, the dew point is to be 0° C. or less.

By controlling the oxidation degree or the dew point to be within the above range depending on the atmosphere, it is possible to stably proceed the secondary recrystallization and to increase the alignment degree of the orientation.

When the oxidation degree is less than 0.00010 in a case where the atmosphere includes the hydrogen, the dense surface silica film formed by the decarburization annealing is reduced before the secondary recrystallization in the final annealing, and thereby, the secondary recrystallization becomes unstable. On the other hand, when the oxidation degree is more than 0.2, the dissolution of the inhibitor such as AlN and (Al, Si)N is promoted, and thereby, the secondary recrystallization becomes unstable. Moreover, when the dew point is more than 0° C. in a case where the atmosphere consists of the inert gas without the hydrogen, the dissolution of the inhibitor such as AlN and (Al, Si)N is promoted, and thereby, the secondary recrystallization becomes unstable. The lower limit of the dew point is not particularly limited, but may be −30° C. for instance.

<Annealing Separator Removing Process>

In the annealing separator removing process, the redundant annealing separator is removed from the surface of the steel sheet after the final annealing (the final annealed sheet) by methods including one or both of water-washing and pickling. Here, the redundant annealing separator indicates, for instance, the unreacted annealing separator which has not reacted with the steel sheet during the final annealing.

When the redundant annealing separator is not sufficiently removed from the surface of the steel sheet, the space factor decreases, and the performance as the iron core deteriorates.

In order to remove the redundant annealing separator, a scrubber may be utilized for removing in addition to the water-washing and the pickling. By utilizing the scrubber, it is possible to reliably remove the redundant annealing separator which deteriorates the wettability in the insulation coating forming process.

Moreover, in a case where the pickling is conducted in order to remove the redundant annealing separator, the pickling may be conducted using the acidic solution whose volume concentration is less than 20%. For instance, it is preferable to utilize the solution including less than 20 volume % in total of at least one of sulfuric acid, nitric acid, hydrochloric acid, phosphoric acid, chloric acid, chromium oxide in aqueous solution, chromate acid mixture, permanganic acid, peroxosulfuric acid, and peroxophosphoric acid. It is more preferable to utilize the solution including less than 10 volume % thereof. The lower limit of the volume concentration is not particularly limited, but may be 0.1 volume % for instance. By utilizing the above solution, it is possible to efficiently remove the redundant annealing separator from the surface of the steel sheet. Herein, the above volume % may be the concentration based on the volume at room temperature.

Moreover, in a case where the pickling is conducted, the temperature of the solution is preferably 20 to 80° C. By controlling the temperature of the solution to be within the above range, it is possible to efficiently remove the redundant annealing separator from the surface of the steel sheet.

<Third Magnetic Domain Refining Process>

In the third magnetic domain refining process, as necessary, the magnetic domain refining treatment is conducted for the final annealed sheet after removing the redundant annealing separator. For instance, as the magnetic domain refining treatment, the groove is formed lineally or punctiformly so as to extend in the direction intersecting the rolling direction and so as to have the predetermined interval in the rolling direction. By forming the above groove, the width of 180° domain is narrowed (180° domain may be refined). By conducting the magnetic domain refining treatment, it is possible to improve the magnetic characteristics of the final product (grain oriented electrical steel sheet). As a method for forming the groove, it is possible to apply a mechanical groove forming method such as toothed gear, a chemical groove forming method such as electrolytic etching, a thermal groove forming method such as laser irradiation, and the like.

<Insulation Coating Forming Process>

In the insulation coating forming process, the insulation coating is formed on the surface of the final annealed sheet after the annealing separator removing process or after the third magnetic domain refining process. In the embodiment, the steel sheet after the insulation coating forming process is referred to as the grain oriented electrical steel sheet.

The coating applies the tension to the grain oriented electrical steel sheet, and thereby, reduces the iron loss as the single steel sheet. Moreover, the coating ensures interlaminar electrical insulation when the grain oriented electrical steel sheets are utilized after being laminated, and thereby, reduces the iron loss as an iron core.

The insulation coating is formed on the surface of the final annealed sheet by applying the insulation coating forming solution which mainly includes at least one of the phosphate or the colloidal silica, by baking at 350 to 600° C., and then by heat-treating at 800 to 1000° C.

The above phosphate is favorably the phosphate of Ca, Al, Sr, and the like. Among these, the aluminum phosphate is more preferable. The above colloidal silica is not particularly limited to the colloidal silica having specific properties. Moreover, the particle size thereof is not particularly limited to specific particle size, but is preferably 200 nm or less (mean number diameter). For instance, the particle size may be 5 to 30 nm. When the particle size thereof is more than 200 nm, the particles may settle in the solution. Moreover, the solution may further include the chromic anhydride or the chromate.

When the baking temperature for the insulation coating is less than 350° C., the solution for the insulation coating drips during passing the steel sheet, poor appearance is caused, and the insulation coating with sufficient adhesion is not obtained. When the baking temperature for the insulation coating is more than 600° C., since the heating rate is excessively fast, only the outermost surface of the insulation coating is solidified, and the solidification of the inside is delayed, the formation of the coating becomes improper and the coating adhesion becomes insufficient. When the temperature of the heat treatment after baking is less than 800° C., the formation of the coating becomes improper (insufficient solidification), and the coating adhesion becomes insufficient. When the temperature of the heat treatment after baking is more than 1000° C., the phosphate is decomposed, the formation of the coating becomes improper, and the coating adhesion becomes insufficient.

In the insulation coating forming, when the oxidation degree ($PH_2O/PH_2$) of the atmosphere is 0.01 to 1.5, the phosphate is not excessively decomposed, and it is possible to favorably form the insulation coating.

The insulation coating forming solution may be applied to the surface of the steel sheet, for instance, by the wet applying method such as roll coater.

By appropriately combining the above processes, the adhesion between the steel sheet without the forsterite film and the insulation coating increases, and the magnetic characteristics are improved (especially, the iron loss decreases). It is necessary to control not only one process in the above processes but each of the above processes comprehensively and inseparably. For instance, the above effect cannot be obtained only by controlling each process independently. The above reason is not clear. However, it is considered that, the functional group such as the hydroxyl group which contributes to the adhesion of the steel sheet surface is controlled until the annealing separator removing process, the morphology of the insulation coating is appropriately controlled from the insulation coating forming process, and thereby, the excellent adhesion and the excellent magnetic characteristics are obtained.

<Fourth Magnetic Domain Refining Process>

In order to reduce the iron loss, as necessary, the magnetic domain refining treatment may be conducted for the grain oriented electrical steel sheet after forming the insulation coating.

For instance, as the magnetic domain refining treatment, the stress-strain or the groove is applied or formed lineally or punctiformly so as to extend in the direction intersecting the rolling direction and so as to have the predetermined interval in the rolling direction. By applying the above stress-strain or forming the above groove, the width of 180° domain is narrowed (180° domain is refined). The above stress-strain may be applied by irradiating laser beam, electron beam, and the like. The above groove may be formed by a mechanical groove forming method such as toothed gear, by a chemical groove forming method such as electrolytic etching, by a thermal groove forming method such as laser irradiation, and the like. In a case where the insulation coating is damaged and the performance such as electrical insulation deteriorates by applying the above stress-strain or forming the above groove, the insulation coating may be formed again, and thereby, the damage may be repaired.

FIG. 1 shows an instance of the method for producing the grain oriented electrical steel sheet according to the embodiment. In the FIGURE, the processed surrounded by the solid line indicates the essential processed, and the processed surrounded by the broken line indicates the optional processes.

The grain oriented electrical steel sheet produced by the method according to the embodiment does not include the forsterite film. Specifically, the grain oriented electrical steel sheet includes a base steel sheet, an intermediate layer which is arranged in contact with the base steel sheet, and the insulation coating which is arranged in contact with the intermediate layer to be an outermost surface.

Whether or not the grain oriented electrical steel sheet includes the forsterite film may be confirmed by X-ray diffraction method. For instance, the X-ray diffraction may be conducted for the surface after removing the insulation coating from the grain oriented electrical steel sheet, and the obtained X-ray diffraction spectrum may be collated with PDF (Powder Diffraction File). The forsterite ($Mg_2SiO_4$) may be identified by JCPDS No. 34-189. In the embodiment, when the primal constituent phase in the above X-ray diffraction spectrum is not the forsterite, the grain oriented electrical steel sheet is judged not to include the forsterite film.

In order to only remove the insulation coating from the grain oriented electrical steel sheet, the grain oriented electrical steel sheet with the coating may be immersed in hot alkaline solution. Specifically, it is possible to remove the insulation coating from the grain oriented electrical steel sheet by immersing the steel sheet in sodium hydroxide aqueous solution which includes 30 mass % of NaOH and 70 mass % of $H_2O$ at 80° C. for 20 minutes, washing it with water, and then, drying it. In general, only insulation coating is removed by the alkaline solution, and the forsterite film is removed by the acidic solution such as hydrochloric acid.

In the grain oriented electrical steel sheet produced by the method according to the embodiment, since the forsterite film is not included, the magnetic characteristics (the iron loss characteristics) are improved. In addition, since each of the processes is optimally controlled, the coating adhesion is improved.

EXAMPLES

Hereinafter, the examples of the present invention are explained. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

In steel slabs having the chemical composition shown in Table 1, the steel slabs of No. A13 and No. a11 were heated to 1350° C., and then hot-rolled to obtain the hot rolled steel sheets having the sheet thickness of 2.6 mm. The hot rolled steel sheets were subjected to the hot band annealing in which the annealing was conducted at 1100° C. and then at 900° C., were pickled in order to remove the surface scale, and then, were cold-rolled once or cold-rolled plural times with the intermediate annealing to obtain the cold rolled steel sheets having the final sheet thickness of 0.22 mm. The cold rolled steel sheets having the final sheet thickness of 0.22 inn were decarburization-annealed in the decarburization annealing process under conditions shown in Tables 2 to 4.

Moreover, in the steel slabs having the chemical composition shown in Table 1, the steel slabs except for No. A13 and No. a11 were heated to 1150° C., and then hot-rolled to obtain the hot rolled steel sheets having the sheet thickness of 2.6 mm. The hot rolled steel sheets were subjected to the hot band annealing in which the annealing was conducted at 1100° C. and then at 900° C., were pickled in order to remove the surface scale, and then, were cold-rolled once or cold-rolled plural times with the intermediate annealing to obtain the cold rolled steel sheets having the final sheet thickness of 0.22 mm. The cold rolled steel sheets having the final sheet thickness of 0.22 mm were decarburization-annealed in the decarburization annealing process under conditions shown in Tables 2 to 4, and thereafter, the nitriding treatment was conducted during cooling by being held in the atmosphere including the ammonia.

In the decarburization annealing, the average heating rate in the heating stage to the annealing temperature was 15° C./second or more.

For the decarburization annealed sheets after the above decarburization annealing, the annealing separator was applied and dried. The conditions of the ratio of MgO and $Al_2O_3$ ($MgO/(MgO+Al_2O_3)$) and the hydration water are shown in Tables 2 to 4.

The decarburization annealed sheets after applying the annealing separator were final-annealed at 1100° C. or 1200° C. for 20 hours. At the time, as shown in Tables 5 to 7, the oxidation degree was controlled when the atmosphere included the hydrogen (112), and the dew point was controlled when the atmosphere did not include the hydrogen.

After the final annealing, in the examples of the pickling "No" shown in Tables, the redundant annealing separator was removed from the steel sheets by water-washing. In the examples of the pickling "Yes" shown in Tables, the redundant annealing separator was removed by water-washing and thereafter pickling. In the pickling, the steel sheets were immersed in the sulfuric acid aqueous solution (volume concentration of sulfuric acid: 1 volume %).

Thereafter, the insulation coating forming solution which mainly included the phosphate or the colloidal silica and which included the chromic anhydride as necessary was applied. In order to form the insulation coating, the above solution was baked at the baking temperature shown in Tables 5 to 7, and then, was heat-treated at the temperature shown in Tables 5 to 7.

Moreover, in the examples, as shown in Tables 8 to 10, the magnetic domain refining treatment was conducted at any timing of (first) between the cold rolling process and the decarburization annealing process, (second) between the decarburization annealing process and the annealing separator applying process, (third) between the annealing separator removing process and the insulation coating forming process, or (fourth) after the insulation coating forming process. For the magnetic domain refinement, the groove was formed mechanically or chemically, or the stress-strain or the groove was applied or formed by the laser.

For the obtained grain oriented electrical steel sheets Nos. B1 to B43 and b1 to b28, the iron loss and the coating adhesion were evaluated.

<Iron Loss>

The samples were taken from the obtained grain oriented electrical steel sheets, and the iron loss W17/50 (W/kg) was measured under the conditions of 50 Hz of AC frequency and 1.7 T of excited magnetic flux density on the basis of the epstein test regulated by JIS C2550-1: 2000. As for the grain oriented electrical steel sheets in which the magnetic domain refinement was conducted, when the iron loss W17/50 was less than 0.7 W/kg, it was judged to as acceptable. As for the grain oriented electrical steel sheets in which the magnetic domain refinement was not conducted, when the iron loss W17/50 was less than 1.0 W/kg, it was judged to as acceptable.

<Coating Adhesion>

The samples were taken from the obtained grain oriented electrical steel sheets, and the coating adhesion of the insulation coating was evaluated by rolling the sample around the cylinder with 20 mm of diameter (180° bending) and by measuring the area fraction of remained coating after bending back. In the evaluation of the coating adhesion of the insulation coating, the presence or absence of delamination of the insulation coating was visually evaluated. When the area fraction of remained coating which was not delaminated from the steel sheet was 90% or more, it was regarded as ⊚ (Very Good). When the area fraction was 85% or more and less than 90%, it was regarded as ○ (Good). When the area fraction was 80% or more and less than 85%, it was regarded as Δ (Poor). When the area fraction was less than 80%, it was regarded as x (NG). When the area fraction of remained coating was 85% or more (the above ⊚ and ○), it was judged to as acceptable.

The results are shown in Tables 8 to 10.

TABLE 1

| STEEL | CHEMICAL COMPOSITION (mass %) (BALANCE CONSISTING OF Fe AND IMPURITIES) | | | | | | | | |
|---|---|---|---|---|---|---|---|---|---|
| No. | C | Si | Mn | S | Se | S + Se | Al | N | OTHER ELEMENTS |
| A1 | 0.030 | 3.45 | 0.10 | 0.006 | | 0.006 | 0.025 | 0.008 | |
| A2 | 0.100 | 3.45 | 0.10 | 0.006 | | 0.006 | 0.025 | 0.008 | |
| A3 | 0.060 | 0.80 | 0.10 | 0.006 | | 0.006 | 0.025 | 0.008 | |
| A4 | 0.060 | 7.00 | 0.10 | 0.006 | | 0.006 | 0.025 | 0.008 | |
| A5 | 0.060 | 3.45 | 0.01 | 0.006 | | 0.006 | 0.025 | 0.008 | Cu: 0.15, Ti: 0.006 |
| A6 | 0.060 | 3.45 | 1.00 | 0.006 | 0.020 | 0.026 | 0.025 | 0.008 | B: 0.002, Cr: 0.08, V: 0.03 |
| A7 | 0.060 | 3.45 | 0.10 | 0.004 | 0.002 | 0.006 | 0.025 | 0.008 | P: 0.10, Nb: 0.05 |
| A8 | 0.060 | 3.45 | 0.10 | 0.050 | 0.010 | 0.060 | 0.025 | 0.008 | Sn: 0.08, Sb: 0.05, Ni: 0.05 |
| A9 | 0.060 | 3.45 | 0.10 | 0.006 | | 0.006 | 0.010 | 0.008 | |
| A10 | 0.060 | 3.45 | 0.10 | 0.006 | | 0.006 | 0.065 | 0.004 | |
| A11 | 0.060 | 3.45 | 0.10 | 0.006 | | 0.006 | 0.025 | 0.012 | |
| A12 | 0.060 | 3.45 | 0.10 | 0.006 | | 0.006 | 0.025 | 0.008 | |
| A13 | 0.080 | 3.25 | 0.08 | 0.025 | 0.001 | 0.026 | 0.025 | 0.007 | Bi: 0.004, Mo: 0.03 |
| a1 | 0.010 | 3.45 | 0.10 | 0.006 | | 0.006 | 0.025 | 0.008 | |
| a2 | 0.400 | 3.45 | 0.10 | 0.006 | | 0.006 | 0.025 | 0.008 | |
| a3 | 0.060 | 0.50 | 0.10 | 0.006 | | 0.006 | 0.025 | 0.008 | |
| a4 | 0.060 | 9.00 | 0.10 | 0.006 | | 0.006 | 0.025 | 0.008 | |
| a5 | 0.060 | 3.45 | 0.004 | 0.006 | | 0.006 | 0.025 | 0.008 | Cu: 0.15, Ti: 0.006 |
| a6 | 0.060 | 3.45 | 1.50 | 0.006 | | 0.006 | 0.025 | 0.008 | B: 0.002, Cr: 0.08, V: 0.03 |
| a7 | 0.060 | 3.45 | 0.10 | 0.070 | | 0.070 | 0.025 | 0.008 | P: 0.10, Nb: 0.05 |
| a8 | 0.060 | 3.45 | 0.10 | 0.080 | 0.010 | 0.090 | 0.025 | 0.008 | Sn: 0.08, Sb: 0.05, Ni: 0.05 |
| a9 | 0.060 | 3.45 | 0.10 | 0.006 | | 0.006 | 0.005 | 0.008 | |
| a10 | 0.060 | 3.45 | 0.10 | 0.006 | | 0.006 | 0.080 | 0.001 | |
| a11 | 0.060 | 3.25 | 0.08 | 0.025 | 0.001 | 0.026 | 0.025 | 0.025 | Bi: 0.004, Mo: 0.03 |

TABLE 2

| | No. | STEEL No. | DECARBURIZATION ANNEALING PROCESS | | | ANNEALING SEPARATOR APPLYING PROCESS | |
|---|---|---|---|---|---|---|---|
| | | | OXIDATION DEGREE (—) | ANNEALING TEMPERATURE (° C.) | HOLDING TIME (sec) | MgO/ (MgO + $Al_2O_3$) (mass %) | HYDRATION WATER (mass %) |
| INVENTIVE EXAMPLE | B1 | A12 | 0.01 | 840 | 60 | 30 | 1.0 |
| | B2 | A12 | 0.15 | 840 | 60 | 30 | 1.0 |
| | B3 | A12 | 0.13 | 750 | 60 | 30 | 1.0 |
| | B4 | A12 | 0.13 | 900 | 60 | 30 | 1.0 |
| | B5 | A12 | 0.13 | 840 | 10 | 30 | 1.0 |
| | B6 | A12 | 0.13 | 840 | 600 | 30 | 1.0 |
| | B7 | A12 | 0.13 | 840 | 60 | 5 | 1.0 |
| | B8 | A12 | 0.13 | 840 | 60 | 50 | 1.0 |
| | B9 | A12 | 0.13 | 840 | 60 | 30 | 1.5 |
| | B10 | A12 | 0.13 | 840 | 60 | 30 | 1.0 |
| | B11 | A12 | 0.13 | 840 | 60 | 30 | 1.0 |
| | B12 | A12 | 0.13 | 840 | 60 | 30 | 1.0 |
| | B13 | A12 | 0.13 | 840 | 60 | 30 | 1.0 |
| | B14 | A12 | 0.13 | 840 | 60 | 30 | 1.0 |
| | B15 | A12 | 0.13 | 840 | 60 | 30 | 1.0 |
| | B16 | A12 | 0.13 | 840 | 60 | 30 | 1.0 |
| | B17 | A12 | 0.13 | 840 | 60 | 30 | 1.0 |
| | B18 | A12 | 0.13 | 840 | 60 | 30 | 1.0 |
| | B19 | A12 | 0.13 | 840 | 60 | 30 | 1.0 |
| | B20 | A12 | 0.13 | 840 | 60 | 30 | 1.0 |
| | B21 | A12 | 0.13 | 840 | 60 | 30 | 1.0 |
| | B22 | A12 | 0.13 | 840 | 60 | 30 | 1.0 |
| | B23 | A12 | 0.13 | 840 | 60 | 30 | 1.0 |
| | B24 | A12 | 0.13 | 840 | 60 | 30 | 1.0 |

TABLE 3

| | No. | STEEL No. | DECARBURIZATION ANNEALING PROCESS | | | ANNEALING SEPARATOR APPLYING PROCESS | |
|---|---|---|---|---|---|---|---|
| | | | OXIDATION DEGREE (—) | ANNEALING TEMPERATURE (° C.) | HOLDING TIME (sec) | MgO/ (MgO + $Al_2O_3$) (mass %) | HYDRATION WATER (mass %) |
| INVENTIVE EXAMPLE | B25 | A12 | 0.10 | 840 | 60 | 40 | 1.0 |
| | B26 | A12 | 0.13 | 840 | 60 | 30 | 1.0 |
| | B27 | A12 | 0.13 | 840 | 60 | 20 | 1.0 |
| | B28 | A13 | 0.10 | 840 | 60 | 40 | 1.0 |
| | B29 | A13 | 0.13 | 840 | 60 | 30 | 1.0 |
| | B30 | A13 | 0.13 | 840 | 60 | 20 | 1.0 |
| | B31 | A1 | 0.13 | 840 | 60 | 30 | 1.0 |
| | B32 | A2 | 0.13 | 840 | 60 | 30 | 1.0 |
| | B33 | A3 | 0.13 | 840 | 60 | 30 | 1.0 |
| | B34 | A4 | 0.13 | 840 | 60 | 30 | 1.0 |
| | B35 | A5 | 0.13 | 840 | 60 | 30 | 1.0 |
| | B36 | A6 | 0.13 | 840 | 60 | 30 | 1.0 |
| | B37 | A7 | 0.13 | 840 | 60 | 30 | 1.0 |
| | B38 | A8 | 0.13 | 840 | 60 | 30 | 1.0 |
| | B39 | A9 | 0.13 | 840 | 60 | 30 | 1.0 |
| | B40 | A10 | 0.13 | 840 | 60 | 30 | 1.0 |
| | B41 | A11 | 0.13 | 840 | 60 | 30 | 1.0 |
| | B42 | A12 | 0.13 | 840 | 60 | 30 | 1.0 |
| | B43 | A12 | 0.13 | 840 | 60 | 30 | 1.0 |
| COMPARATIVE EXAMPLE | b1 | A12 | 0.003 | 840 | 60 | 30 | 1.0 |
| | b2 | A12 | 0.30 | 840 | 60 | 30 | 1.0 |
| | b3 | A12 | 0.13 | 600 | 60 | 30 | 1.0 |
| | b4 | A12 | 0.13 | 1000 | 60 | 30 | 1.0 |
| | b5 | A12 | 0.13 | 840 | 5 | 30 | 1.0 |

TABLE 4

| | No. | STEEL No. | DECARBURIZATION ANNEALING PROCESS | | | ANNEALING SEPARATOR APPLYING PROCESS | |
|---|---|---|---|---|---|---|---|
| | | | OXIDATION DEGREE (—) | ANNEALING TEMPERATURE (° C.) | HOLDING TIME (sec) | MgO/ (MgO + $Al_2O_3$) (mass %) | HYDRATION WATER (mass %) |
| COMPARATIVE EXAMPLE | b6 | A12 | 0.13 | 840 | 800 | 30 | 1.0 |
| | b7 | A12 | 0.13 | 840 | 60 | 0 | 1.0 |
| | b8 | A12 | 0.13 | 840 | 60 | 60 | 1.0 |
| | b9 | A12 | 0.13 | 840 | 60 | 30 | 3.0 |
| | b10 | A12 | 0.13 | 840 | 60 | 30 | 1.0 |
| | b11 | A12 | 0.13 | 840 | 60 | 30 | 1.0 |
| | b12 | A12 | 0.13 | 840 | 60 | 30 | 1.0 |
| | b13 | A12 | 0.13 | 840 | 60 | 30 | 1.0 |
| | b14 | A12 | 0.13 | 840 | 60 | 30 | 1.0 |
| | b15 | A12 | 0.13 | 840 | 60 | 30 | 1.0 |
| | b16 | A12 | 0.13 | 840 | 60 | 30 | 1.0 |
| | b17 | a1 | 0.13 | 840 | 60 | 30 | 1.0 |
| | b18 | a2 | 0.13 | 840 | 60 | 30 | 1.0 |
| | b19 | a3 | 0.13 | 840 | 60 | 30 | 1.0 |
| | b20 | a4 | — | — | — | — | — |
| | b21 | a5 | 0.13 | 840 | 60 | 30 | 1.0 |
| | b22 | a6 | 0.13 | 840 | 60 | 30 | 1.0 |
| | b23 | a7 | 0.13 | 840 | 60 | 30 | 1.0 |
| | b24 | a8 | 0.13 | 840 | 60 | 30 | 1.0 |
| | b25 | a9 | 0.13 | 840 | 60 | 30 | 1.0 |
| | b26 | a10 | 0.13 | 840 | 60 | 30 | 1.0 |
| | b27 | a11 | 0.13 | 840 | 60 | 30 | 1.0 |
| | b28 | a10 | 0.13 | 840 | 60 | 30 | 1.0 |

TABLE 5

| | | | FINAL ANNEALING PROCESS | | | | ANNEALING | ADDITION OF | INSULATION COATING FORMING PROCESS | |
|---|---|---|---|---|---|---|---|---|---|---|
| | NO. | STEEL NO. | ATMO-SPHERE (—) | TEMPER-ATURE ° C. | OXIDATION DEGREE (—) | DEW POINT (° C.) | SEPARATOR PICKLING (YES OR NO) | CHROMIC ANHYDRIDE (YES OR NO) | BAKING TEMPERATURE (° C.) | HEAT TREATMENT TEMPERATURE (° C.) |
| INVENTIVE EXAMPLE | B1 | A12 | $H_2 + N_2$ | 1200 | 0.05 | — | YES | YES | 400 | 850 |
| | B2 | A12 | $H_2 + N_2$ | 1200 | 0.05 | — | YES | YES | 400 | 850 |
| | B3 | A12 | $H_2 + N_2$ | 1200 | 0.05 | — | YES | YES | 400 | 850 |
| | B4 | A12 | $H_2 + N_2$ | 1200 | 0.05 | — | YES | YES | 400 | 850 |
| | B5 | A12 | $H_2 + N_2$ | 1200 | 0.05 | — | YES | YES | 400 | 850 |
| | B6 | A12 | $H_2 + N_2$ | 1200 | 0.05 | — | YES | YES | 400 | 850 |
| | B7 | A12 | $H_2 + N_2$ | 1200 | 0.05 | — | YES | YES | 400 | 850 |
| | B8 | A12 | $H_2 + N_2$ | 1200 | 0.05 | — | YES | YES | 400 | 850 |
| | B9 | A12 | $H_2 + N_2$ | 1200 | 0.05 | — | YES | YES | 400 | 870 |
| | B10 | A12 | $H_2 + N_2$ | 1200 | 0.0001 | — | YES | YES | 400 | 870 |
| | B11 | A12 | $H_2 + N_2$ | 1200 | 0.20 | — | YES | YES | 400 | 870 |
| | B12 | A12 | $N_2$ | 1200 | — | −60 | YES | YES | 400 | 870 |
| | B13 | A12 | $H_2 + N_2$ | 1200 | 0.05 | — | YES | YES | 400 | 870 |
| | B14 | A12 | $H_2 + N_2$ | 1200 | 0.05 | — | NO | YES | 400 | 870 |
| | B15 | A12 | $H_2 + N_2$ | 1200 | 0.05 | — | YES | NO | 350 | 870 |
| | B16 | A12 | $H_2 + N_2$ | 1200 | 0.05 | — | YES | YES | 600 | 870 |
| | B17 | A12 | $H_2 + N_2$ | 1200 | 0.05 | — | YES | YES | 450 | 800 |
| | B18 | A12 | $H_2 + N_2$ | 1200 | 0.05 | — | YES | YES | 450 | 1000 |
| | B19 | A12 | $H_2 + N_2$ | 1200 | 0.05 | — | YES | YES | 450 | 850 |
| | B20 | A12 | $H_2 + N_2$ | 1200 | 0.05 | — | YES | YES | 450 | 850 |
| | B21 | A12 | $H_2 + N_2$ | 1200 | 0.05 | — | YES | YES | 450 | 850 |
| | B22 | A12 | $H_2 + N_2$ | 1200 | 0.05 | — | YES | YES | 450 | 850 |
| | B23 | A12 | $H_2 + N_2$ | 1200 | 0.05 | — | YES | YES | 450 | 850 |
| | B24 | A12 | $H_2 + N_2$ | 1200 | 0.05 | — | YES | YES | 450 | 850 |

TABLE 6

| | | FINAL ANNEALING PROCESS | | | ANNEALING | ADDITION OF | INSULATION COATING FORMING PROCESS | | |
|---|---|---|---|---|---|---|---|---|---|
| | STEEL NO. | ATMO-SPHERE (—) | TEMPER-ATURE °C. | OXIDATION DEGREE (—) | DEW POINT (° C.) | SEPARATOR PICKLING (YES OR NO) | CHROMIC ANHYDRIDE (YES OR NO) | HEAT BAKING TEMPERATURE (° C.) | TREATMENT TEMPERATURE (° C.) |
| INVENTIVE EXAMPLE | | | | | | | | | |
| B25 | A12 | $H_2 + N_2$ | 1200 | 0.05 | — | YES | YES | 450 | 870 |
| B26 | A12 | $H_2 + N_2$ | 1200 | 0.05 | — | YES | YES | 400 | 870 |
| B27 | A12 | $H_2 + N_2$ | 1200 | 0.05 | — | YES | YES | 400 | 850 |
| B28 | A13 | $H_2 + N_2$ | 1200 | 0.05 | — | YES | YES | 450 | 870 |
| B29 | A13 | $H_2 + N_2$ | 1200 | 0.05 | — | YES | YES | 400 | 870 |
| B30 | A13 | $H_2 + N_2$ | 1200 | 0.05 | — | YES | YES | 400 | 850 |
| B31 | A1 | $H_2 + N_2$ | 1200 | 0.05 | — | YES | YES | 400 | 870 |
| B32 | A2 | $H_2 + N_2$ | 1200 | 0.05 | — | YES | YES | 400 | 870 |
| B33 | A3 | $H_2 + N_2$ | 1100 | 0.05 | — | YES | YES | 400 | 870 |
| B34 | A4 | $H_2 + N_2$ | 1200 | 0.05 | — | YES | YES | 400 | 870 |
| B35 | A5 | $H_2 + N_2$ | 1200 | 0.05 | — | YES | YES | 400 | 870 |
| B36 | A6 | $H_2 + N_2$ | 1200 | 0.05 | — | YES | YES | 400 | 870 |
| B37 | A7 | $H_2 + N_2$ | 1200 | 0.05 | — | YES | YES | 400 | 870 |
| B38 | A8 | $H_2 + N_2$ | 1200 | 0.05 | — | YES | YES | 400 | 870 |
| B39 | A9 | $H_2 + N_2$ | 1200 | 0.05 | — | YES | YES | 400 | 870 |
| B40 | A10 | $H_2 + N_2$ | 1200 | 0.05 | — | YES | YES | 400 | 870 |
| B41 | A11 | $H_2 + N_2$ | 1200 | 0.05 | — | YES | YES | 400 | 870 |
| B42 | A12 | $N_2$ | 1200 | — | −5 | YES | YES | 400 | 870 |
| B43 | A12 | $H_2 + N_2$ | 1200 | 0.05 | — | YES | YES | 400 | 870 |
| COMPARATIVE EXAMPLE | | | | | | | | | |
| b1 | A12 | $H_2 + N_2$ | 1200 | 0.05 | — | YES | YES | 400 | 850 |
| b2 | A12 | $H_2 + N_2$ | 1200 | 0.05 | — | YES | YES | 400 | 850 |
| b3 | A12 | $H_2 + N_2$ | 1200 | 0.05 | — | YES | YES | 400 | 850 |
| b4 | A12 | $H_2 + N_2$ | 1200 | 0.05 | — | YES | YES | 400 | 850 |
| b5 | A12 | $H_2 + N_2$ | 1200 | 0.05 | — | YES | YES | 400 | 850 |

TABLE 7

| | NO. | STEEL NO. | FINAL ANNEALING PROCESS | | | | ANNEALING SEPARATOR PICKLING (YES OR NO) | INSULATION COATING FORMING PROCESS | | | HEAT TREATMENT TEMPERATURE (°C.) |
| | | | ATMO-SPHERE (—) | TEMPER-ATURE °C. | OXIDATION DEGREE (—) | DEW POINT (°C.) | | ADDITION OF CHROMIC ANHYDRIDE (YES OR NO) | BAKING TEMPERATURE (°C.) | | |
|---|---|---|---|---|---|---|---|---|---|---|---|
| COMPARATIVE EXAMPLE | b6 | A12 | $H_2 + N_2$ | 1200 | 0.05 | — | YES | YES | 400 | | 850 |
| | b7 | A12 | $H_2 + N_2$ | 1200 | 0.05 | — | YES | YES | 400 | | 850 |
| | b8 | A12 | $H_2 + N_2$ | 1200 | 0.05 | — | YES | YES | 400 | | 850 |
| | b9 | A12 | $H_2 + N_2$ | 1200 | 0.05 | — | YES | YES | 400 | | 850 |
| | b10 | A12 | $H_2 + N_2$ | 1200 | 0.00008 | — | YES | YES | 400 | | 850 |
| | b11 | A12 | $H_2 + N_2$ | 1200 | 0.50 | — | YES | YES | 400 | | 850 |
| | b12 | A12 | $N_2$ | 1200 | — | 10 | YES | YES | 400 | | 850 |
| | b13 | A12 | $H_2 + N_2$ | 1200 | 0.05 | — | YES | YES | 300 | | 850 |
| | b14 | A12 | $H_2 + N_2$ | 1200 | 0.05 | — | YES | YES | 800 | | 850 |
| | b15 | A12 | $H_2 + N_2$ | 1200 | 0.05 | — | YES | YES | 400 | | 700 |
| | b16 | A12 | $H_2 + N_2$ | 1200 | 0.05 | — | YES | YES | 400 | | 1050 |
| | b17 | a1 | $H_2 + N_2$ | 1200 | 0.05 | — | YES | YES | 400 | | 870 |
| | b18 | a2 | $H_2 + N_2$ | 1200 | 0.05 | — | YES | YES | 400 | | 870 |
| | b19 | a3 | $H_2 + N_2$ | 1100 | 0.05 | — | YES | YES | 400 | | 870 |
| | b20 | a4 | — | — | — | — | — | — | — | | — |
| | b21 | a5 | $H_2 + N_2$ | 1200 | 0.05 | — | YES | YES | 400 | | 870 |
| | b22 | a6 | $H_2 + N_2$ | 1200 | 0.05 | — | YES | YES | 400 | | 870 |
| | b23 | a7 | $H_2 + N_2$ | 1200 | 0.05 | — | YES | YES | 400 | | 870 |
| | b24 | a8 | $H_2 + N_2$ | 1200 | 0.05 | — | YES | YES | 400 | | 870 |
| | b25 | a9 | $H_2 + N_2$ | 1200 | 0.05 | — | YES | YES | 400 | | 870 |
| | b26 | a10 | $H_2 + N_2$ | 1200 | 0.05 | — | YES | YES | 400 | | 870 |
| | b27 | a11 | $H_2 + N_2$ | 1200 | 0.05 | — | YES | YES | 400 | | 870 |
| | b28 | a10 | $H_2 + N_2$ | 1200 | 0.05 | — | YES | YES | 400 | | 870 |

TABLE 8

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| INVENTIVE EXAMPLE | B1 | A12 | FOURTH | LASER IRRADIATION | 0.66 | ○ |
| | B2 | A12 | FOURTH | LASER IRRADIATION | 0.67 | ○ |
| | B3 | A12 | FOURTH | LASER IRRADIATION | 0.66 | ○ |
| | B4 | A12 | FOURTH | LASER IRRADIATION | 0.69 | ○ |
| | B5 | A12 | FOURTH | LASER IRRADIATION | 0.68 | ○ |
| | B6 | A12 | FOURTH | LASER IRRADIATION | 0.67 | ○ |
| | B7 | A12 | FOURTH | LASER IRRADIATION | 0.69 | ○ |
| | B8 | A12 | FOURTH | LASER IRRADIATION | 0.68 | ○ |
| | B9 | A12 | FOURTH | LASER IRRADIATION | 0.67 | ○ |
| | B10 | A12 | FOURTH | LASER IRRADIATION | 0.66 | ○ |
| | B11 | A12 | FOURTH | LASER IRRADIATION | 0.69 | ○ |
| | B12 | A12 | FOURTH | LASER IRRADIATION | 0.68 | ○ |
| | B13 | A12 | FOURTH | LASER IRRADIATION | 0.69 | ○ |
| | B14 | A12 | FOURTH | LASER IRRADIATION | 0.68 | ○ |
| | B15 | A12 | FOURTH | LASER IRRADIATION | 0.67 | ○ |
| | B16 | A12 | FOURTH | LASER IRRADIATION | 0.66 | ○ |
| | B17 | A12 | FOURTH | LASER IRRADIATION | 0.66 | ○ |
| | B18 | A12 | FOURTH | LASER IRRADIATION | 0.68 | ○ |
| | B19 | A12 | FIRST | MECHANICAL GROOVE FORMING | 0.63 | ◉ |
| | B20 | A12 | SECOND | MECHANICAL GROOVE FORMING | 0.61 | ◉ |
| | B21 | A12 | THIRD | MECHANICAL GROOVE FORMING | 0.62 | ◉ |
| | B22 | A12 | FIRST | CHEMICAL GROOVE FORMING | 0.63 | ◉ |
| | B23 | A12 | SECOND | CHEMICAL GROOVE FORMING | 0.64 | ◉ |
| | B24 | A12 | THIRD | CHEMICAL GROOVE FORMING | 0.63 | ◉ |

TABLE 9

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| INVENTIVE EXAMPLE | B25 | A12 | FOURTH | LASER IRRADIATION | 0.61 | ◉ |
| | B26 | A12 | FOURTH | LASER IRRADIATION | 0.63 | ◉ |
| | B27 | A12 | FOURTH | LASER IRRADIATION | 0.62 | ◉ |
| | B28 | A13 | FOURTH | LASER IRRADIATION | 0.62 | ◉ |
| | B29 | A13 | FOURTH | LASER IRRADIATION | 0.63 | ◉ |
| | B30 | A13 | FOURTH | LASER IRRADIATION | 0.64 | ◉ |
| | B31 | A1 | FOURTH | LASER IRRADIATION | 0.66 | ○ |

TABLE 9-continued

| | No. | STEEL No. | MAGNETIC DOMAIN REFINEMENT TIMING FOR CONTROLLING | METHOD | IRON LOSS W17/50 (W/kg) | COATING ADHESION |
|---|---|---|---|---|---|---|
| | B32 | A2 | FOURTH | LASER IRRADIATION | 0.68 | ○ |
| | B33 | A3 | FOURTH | LASER IRRADIATION | 0.69 | ○ |
| | B34 | A4 | FOURTH | LASER IRRADIATION | 0.68 | ○ |
| | B35 | A5 | FOURTH | LASER IRRADIATION | 0.69 | ○ |
| | B36 | A6 | FOURTH | LASER IRRADIATION | 0.67 | ○ |
| | B37 | A7 | FOURTH | LASER IRRADIATION | 0.65 | ○ |
| | B38 | A8 | FOURTH | LASER IRRADIATION | 0.66 | ○ |
| | B39 | A9 | FOURTH | LASER IRRADIATION | 0.66 | ○ |
| | B40 | A10 | FOURTH | LASER IRRADIATION | 0.67 | ○ |
| | B41 | A11 | FOURTH | LASER IRRADIATION | 0.68 | ○ |
| | B42 | A12 | FOURTH | LASER IRRADIATION | 0.68 | ○ |
| | B43 | A12 | NO | — | 0.93 | ◉ |
| COMPARATIVE EXAMPLE | b1 | A12 | FOURTH | LASER IRRADIATION | 1.14 | Δ |
| | b2 | A12 | FOURTH | LASER IRRADIATION | 0.82 | Δ |
| | b3 | A12 | FOURTH | LASER IRRADIATION | 1.50 | Δ |
| | b4 | A12 | FOURTH | ILASER IRRADIATION | 1.20 | Δ |
| | b5 | A12 | FOURTH | LASER IRRADIATION | 1.09 | Δ |

TABLE 10

| | No. | STEEL No. | MAGNETIC DOMAIN REFINEMENT TIMING FOR CONTROLLING | IRON LOSS METHOD | IRON LOSS W17/50 (W/kg) | COATING ADHESION |
|---|---|---|---|---|---|---|
| COMPARATIVE EXAMPLE | b6 | A12 | FOURTH | LASER IRRADIATION | 0.79 | Δ |
| | b7 | A12 | FOURTH | LASER IRRADIATION | 1.02 | Δ |
| | b8 | A12 | FOURTH | LASER IRRADIATION | 0.94 | Δ |
| | b9 | A12 | FOURTH | LASER IRRADIATION | 0.81 | Δ |
| | b10 | A12 | FOURTH | LASER IRRADIATION | 0.83 | Δ |
| | b11 | A12 | FOURTH | LASER IRRADIATION | 0.84 | Δ |
| | b12 | A12 | FOURTH | LASER IRRADIATION | 0.83 | Δ |
| | b13 | A12 | FOURTH | LASER IRRADIATION | 0.79 | x |
| | b14 | A12 | FOURTH | LASER IRRADIATION | 0.75 | x |
| | b15 | A12 | FOURTH | LASER IRRADIATION | 0.74 | x |
| | b16 | A12 | FOURTH | LAER IRRADIATION | 0.79 | x |
| | b17 | a1 | FOURTH | LASER IRRADIATION | 0.75 | ○ |
| | b18 | a2 | FOURTH | LASER IRRADIATION | 0.74 | ○ |
| | b19 | a3 | FOURTH | LASER IRRADIATION | 0.84 | ○ |
| | b20 | a4 | — | — | — | — |

TABLE 10-continued

| No. | STEEL No. | TIMING FOR CONTROLLING | MAGNETIC DOMAIN REFINEMENT IRON LOSS METHOD | IRON LOSS W17/50 (W/kg) | COATING ADHESION |
|---|---|---|---|---|---|
| b21 | a5 | FOURTH | LASER IRRADIATION | 0.92 | ○ |
| b22 | a6 | FOURTH | LASER IRRADIATION | 1.09 | ○ |
| b23 | a7 | FOURTH | LASER IRRADIATION | 1.07 | ○ |
| b24 | a8 | FOURTH | LASER IRRADIATION | 1.05 | ○ |
| b25 | a9 | FOURTH | LASER IRRADIATION | 0.94 | ○ |
| b26 | a10 | FOURTH | LASER IRRADIATION | 1.10 | ○ |
| b27 | a11 | FOURTH | LASER IRRADIATION | 0.88 | ○ |
| b28 | a10 | NO | — | 1.40 | ○ |

As shown in Tables 1 to 10, in the inventive examples Nos. Bi to B43, all process conditions satisfied the range of the present invention, and thus, the iron loss was low. Moreover, the coating adhesion was excellent.

On the other hand, in the comparative examples Nos. b1 to b28, at least one of the process conditions was out of the range of the present invention, and thus, the iron loss and/or the coating adhesion was insufficient. Herein, in the comparative example No. b20, the rolling could not be conducted, the evaluation thereafter was not conducted.

INDUSTRIAL APPLICABILITY

According to the above aspects of the present invention, it is possible to provide the method for producing the grain oriented electrical steel sheet without the forsterite film and excellent in the magnetic characteristics and the coating adhesion. The obtained grain oriented electrical steel sheet is excellent in the magnetic characteristics and the coating adhesion, and therefore, the present invention has significant industrial applicability.

What is claimed is:

1. A method for producing a grain oriented electrical steel sheet, the method comprising:
a hot rolling process of hot-rolling a steel piece to obtain a hot rolled steel sheet, the steel piece including, as a chemical composition, by mass %,
0.030 to 0.100% of C,
0.80 to 7.00% of Si,
0.01 to 1.00% of Mn,
0 to 0.060% in total of S and Se,
0.010 to 0.065% of acid soluble Al,
0.004 to 0.012% of N,
0 to 0.30% of Cr,
0 to 0.40% of Cu,
0 to 0.50% of P,
0 to 0.30% of Sn,
0 to 0.30% of Sb,
0 to 1.00% of Ni,
0 to 0.008% of B,
0 to 0.15% of V,
0 to 0.20% of Nb,
0 to 0.10% of Mo,
0 to 0.015% of Ti,
0 to 0.010% of Bi, and
a balance consisting of Fe and impurities;
a hot band annealing process subsequent to the hot rolling process, the hot band annealing process of annealing the hot rolled steel sheet to obtain a hot band annealed sheet;
a hot band pickling process subsequent to the hot band annealing process, the hot band pickling process of pickling the hot band annealed sheet;
a cold rolling process subsequent to the hot band pickling process, the cold rolling process of cold-rolling the hot band annealed sheet to obtain a cold rolled steel sheet;
a first magnetic domain refining process subsequent to the cold rolling process, the first magnetic domain refining process of optionally conducting a magnetic domain refining treatment for the cold rolled steel sheet;
a decarburization annealing process subsequent to the cold rolling process or the first magnetic domain refining process, the decarburization annealing process of decarburization-annealing the cold rolled steel sheet to obtain a decarburization annealed sheet;
a second magnetic domain refining process subsequent to the decarburization annealing process, the second magnetic domain refining process of optionally conducting a magnetic domain refining treatment for the decarburization annealed sheet;
an annealing separator applying process subsequent to the decarburization annealing process or the second magnetic domain refining process, the annealing separator applying process of applying and drying an annealing separator including $Al_2O_3$ and MgO to the decarburization annealed sheet;
a final annealing process subsequent to the annealing separator applying process, the final annealing process of final-annealing the decarburization annealed sheet after applying the annealing separator to obtain a final annealed sheet;
an annealing separator removing process subsequent to the final annealing process, the annealing separator removing process of removing a redundant annealing separator from a surface of the final annealed sheet;
a third magnetic domain refining process subsequent to the annealing separator removing process, the third magnetic domain refining process of optionally conducting a magnetic domain refining treatment for the final annealed sheet; and an insulation coating forming process subsequent to the annealing separator removing process or the third magnetic domain refining process, the insulation coating forming process of forming an insulation coating on the surface of the final annealed sheet, wherein, in the decarburization annealing process, $PH_2O/PH_2$ which is an oxidation degree of an atmosphere is 0.01 to 0.15, an annealing temperature is 750 to 900° C., and a holding is 10 to 600 seconds, wherein, in the annealing separator applying process, $MgO/(MgO+Al_2O_3)$ which is a mass ratio of MgO and $Al_2O_3$ is 5 to 50%, and a hydration water is 1.5 mass % or less in the annealing separator, wherein, in the final annealing process, an oxidation degree is 0.00010 to 0.2 when an atmosphere includes a hydrogen, or a dew point is 0° C. or less when an atmosphere consists of an inert gas without a hydrogen, and wherein, in the insulation coating forming process, the insulation coating is formed by applying an insulation coating forming solution which mainly includes a phosphate or a colloidal silica, by baking at 350 to 600° C., and then by heat-treating at 800 to 1000° C. in an atmosphere where an oxidation degree ($PH_2O/PH_2$) is 0.01 to 1.5.

2. The method for producing the grain oriented electrical steel sheet according to claim 1, wherein, in the decarburization annealing process, a nitriding treatment is conducted by annealing the cold rolled steel sheet in an atmosphere including ammonia.

3. The method for producing the grain oriented electrical steel sheet according to claim 1, wherein any one process of the first magnetic domain refining process, the second magnetic domain refining process, and the third magnetic domain refining process is only conducted.

4. The method for producing the grain oriented electrical steel sheet according to claim 1, the method including a fourth magnetic domain refining process subsequent to the insulation coating forming process.

5. The method for producing the grain oriented electrical steel sheet according to claim 4, wherein any one process of the first magnetic domain refining process, the second magnetic domain refining process, the third magnetic domain refining process, and the fourth magnetic domain refining process is only conducted.

6. The method for producing the grain oriented electrical steel sheet according to claim 1, wherein, in the annealing separator removing process, a pickling is conducted after water-washing using an acidic solution whose volume concentration is less than 20%.

7. The method for producing the grain oriented electrical steel sheet according to claim 1, wherein, the steel piece includes, as the chemical composition, by mass %, at least one of 0.02 to 0.30% of Cr,
0.05 to 0.40% of Cu,
0.005 to 0.50% of P,
0.02 to 0.30% of Sn,
0.01 to 0.30% of Sb,
0.01 to 1.00% of Ni,
0.0005 to 0.008% of B,
0.002 to 0.15% of V,
0.005 to 0.20% of Nb,
0.005 to 0.10% of Mo,
0.002 to 0.015% of Ti, and
0.01 0.010% of Bi.

8. A method for producing a grain oriented electrical steel sheet, the method comprising:

a hot rolling process of hot-rolling a steel piece to obtain a hot rolled steel sheet, the steel piece including, as a chemical composition, by mass %, 0.030 to 0.100% of C,
0.80 to 7.00% of Si,
0.01 to 1.00% of Mn,
0 to 0.060% in total of S and Se,
0.010 to 0.065% of acid soluble Al,
0.004 to 0.012% of N,
0 to 0.30% of Cr,
0 to 0.40% of Cu,
0 to 0.50% of P,
0 to 0.30% of Sn,
0 to 0.30% of Sb,
0 to 1.00% of Ni,
0 to 0.008% of B,
0 to 0.15% of V,
0 to 0.20% of Nb,
0 to 0.10% of Mo,
0 to 0.015% of Ti,
0 to 0.010% of Bi, and
a balance comprising Fe and impurities;

a hot band annealing process subsequent to the hot rolling process, the hot band annealing process of annealing the hot rolled steel sheet to obtain a hot band annealed sheet;

a hot band pickling process subsequent to the hot band annealing process, the hot band pickling process of pickling the hot band annealed sheet;

a cold rolling process subsequent to the hot band pickling process, the cold rolling process of cold-rolling the hot band annealed sheet to obtain a cold rolled steel sheet;

a first magnetic domain refining process subsequent to the cold rolling process, the first magnetic domain refining process of optionally conducting a magnetic domain refining treatment for the cold rolled steel sheet;

a decarburization annealing process subsequent to the cold rolling process or the first magnetic domain refining process, the decarburization annealing process of decarburization-annealing the cold rolled steel sheet to obtain a decarburization annealed sheet;

a second magnetic domain refining process subsequent to the decarburization annealing process, the second magnetic domain refining process of optionally conducting a magnetic domain refining treatment for the decarburization annealed sheet;

an annealing separator applying process subsequent to the decarburization annealing process or the second magnetic domain refining process, the annealing separator applying process of applying and drying an annealing separator including $Al_2O_3$ and MgO to the decarburization annealed sheet;

a final annealing process subsequent to the annealing separator applying process, the final annealing process of final-annealing the decarburization annealed sheet after applying the annealing separator to obtain a final annealed sheet;

an annealing separator removing process subsequent to the final annealing process, the annealing separator removing process of removing a redundant annealing separator from a surface of the final annealed sheet;

a third magnetic domain refining process subsequent to the annealing separator removing process, the third magnetic domain refining process of optionally conducting a magnetic domain refining treatment for the final annealed sheet; and an insulation coating forming process subsequent to the annealing separator removing process or the third magnetic domain refining process, the insulation coating forming process of forming an insulation coating on the surface of the final annealed sheet, wherein, in the decarburization annealing process, $PH_2O/PH_2$ which is an oxidation degree of an atmosphere is 0.01 to 0.15, an annealing temperature is 750 to 900° C., and a holding is 10 to 600 seconds, wherein, in the annealing separator applying process, $MgO/(MgO+Al_2O_3)$ which is a mass ratio of MgO and $Al_2O_3$ is 5 to 50%, and a hydration water is 1.5 mass % or less in the annealing separator, wherein, in the final annealing process, an oxidation degree is 0.00010 to 0.2 when an atmosphere includes a hydrogen, or a dew point is 0° C. or less when an atmosphere comprises an inert gas without a hydrogen, and wherein, in the insulation coating forming process, the insulation coating is formed by applying an insulation coating forming solution which mainly includes a phosphate or a colloidal silica, by baking at 350 to 600° C., and then by heat-treating at 800 to 1000° C. in an atmosphere where an oxidation degree ($PH_2O/PH_2$) is 0.01 to 1.5.

* * * * *